Nov. 6, 1956  J. N. LIEBMAN  2,769,301

SELF-WINDING MECHANISM FOR VEHICLE CLOCK

Filed April 22, 1954

INVENTOR.
JOSEPH N. LIEBMAN
BY
ATTORNEY 2,769,301
SELF-WINDING MECHANISM FOR VEHICLE CLOCK

Joseph N. Liebman, North Miami Beach, Fla.

Application April 22, 1954, Serial No. 424,884

3 Claims. (Cl. 58—46)

This invention relates to a self-winding mechanism for a clock. While the mechanism is intended primarily for use with automobile clocks, it may be used in connection with clocks of other vehicles, or with clocks for motor boats and like conveyances, that are subject in use to motions in two different directions.

One object of the invention is to provide a mechanism that operates to wind the mainspring upon either or both horizontal and vertical movements of the vehicle or conveyance.

Another object is to provide a self-winding mechanism, which because of the fact that it operates on movements in either or both horizontal and vertical directions, permits of a higher gear ratio, therefore causing less strain on the gears of the self-winding mechanism, permitting easier winding of the mainspring and allowing for use of a longer and stronger mainspring, which in turn results in building up a longer lasting reserve of power in the mainspring.

A further object is to provide a self-winding mechanism that can be readily removed as a unit from the clock movement, thereby making it easier to repair either the clock movement or the self-winding unit independently of the other.

A still further object is to provide a self-winding mechanism of simple design and construction so that it may be easily overhauled or repaired by a watchmaker of ordinary skill.

A further object is to provide a self-winding mechanism that is inexpensive to construct or repair.

A still further object is to provide a self-winding mechanism that may be used in connection with automobile clocks that are designed to be mounted upon the dashboard, the steering wheel, or other suitable part of the vehicle.

In operation of an automobile the body is subject to movements having vertical components, due to vibration, passing over bumps or rough roads, or from other causes, as well as to movements having horizontal components arising from normal forward or backward motions of the car. Moreover, motions having either or both of such components occur upon sudden stopping or starting. The self-winding mechanism of this invention takes advantage of all of these movements.

The accompanying drawings illustrate an embodiment of the invention, in which.

Figure 1:
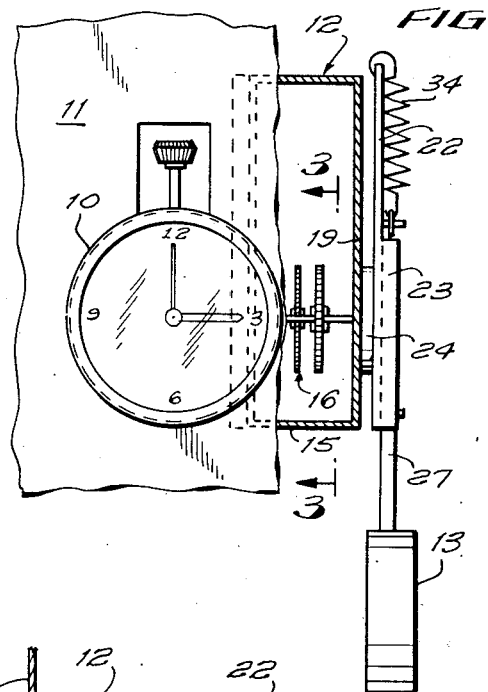
Figure 1 is a front elevational view showing a clock mounted on a dashboard, and the self-winding mechanism extending rearwardly from the latter, the housing of the gear train of the mechanism being partly in section.
Figure 3:
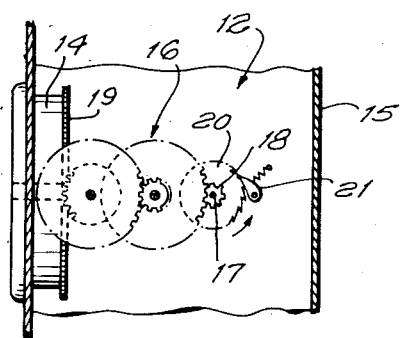
Fig. 3 is a part-sectional view in elevation taken on the line 3—3 of Fig. 1; and, Fig. 4 is a part-sectional plan view taken on the line 4—4 of Fig. 2.
Figure 4:
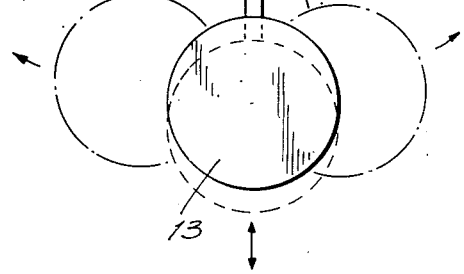

A clock 10 is mounted on the dashboard 11 or other suitable part of the vehicle or conveyance to which it is applied. The self-winding mechanism 12, to which this invention relates, extends rearwardly of the clock mounting in position that the pendulum plate 22, with the frame or slide 25 and the weight 13 suspended therefrom of the mechanism will swing in the plane of direction of travel of the vehicle or conveyance, and may be detached as a unit from the clock casing 14.

The mechanism 12 comprises a housing 15 that encloses a train of gears 16. A spindle or arbor 17 extends across the housing with its ends bearing in the side walls thereof. A driving gear 18 is carried on the spindle, which gear actuates the gear train to rotate intermittently the wheel 19 that winds the mainspring (not shown) of the clock. A ratchet-wheel 20 is fixed to the foot of the spindle, and a pawl 21 engages the ratchet to permit of rotation of the spindle in winding direction only and to prevent movement in reverse direction.

The head of spindle 17 extends outward of one of the side walls of housing 15, and a plate 22 is pivotally supported thereon for oscillation in a plane substantially at right angles to the axis of the spindle, such oscillation being caused by the swinging movements of the pendulum weight 13. The plate has parallel guideways 23—23 on the lower portion of its face adjacent to its longitudinal edges. A washer 24 may be inserted between the plate and the housing. A frame or slide 25 is mounted to slide up and down in the guideways. Stops 26—26 are provided to limit those movements. The arm 27 of the pendulum weight 13 is fixed to the lower cross-member of the frame, as shown in Fig. 2.

A toothed wheel 28 having a hub 29 is fixed to the head portion of spindle 17 by a pin 30 or other fastening means. The wheel is located on, though not attached to, the face of the plate in position within the frame 25. Two toothed racks 31—31 are carried by the frame for engagement with the wheel 28 at opposite sides. The racks are slidably supported on two cross-rods 32—32 of the frame structure. Springs 33 are coiled about the rods and bear against the outer edge of each rack, at its top and bottom, to urge the racks resiliently into contact with the wheel 28. Each time that the pendulum swings in winding direction during normal forward or backward movements of the vehicle or conveyance, or upon sudden starts or stops, engagement of the racks with wheel 28 cause the wheel and spindle 17 to turn. These impulses transmitted through the gears serve as one means of winding the clock. During each swinging movement of the pendulum in opposite direction, the ratchet and pawl hold the spindle 17 and wheel 28 immovable. The springs 33 that bear on the racks 31 permit the racks to slide or move out of operative contact with the wheel 28 at those intervals.

In the particular form of winding mechanism illustrated in the drawings, winding of the clock is effected by rearward swinging movements of the pendulum plate 22 and its weight 13, and the spindle 17 turns counter-clockwise. This, however, is a matter of choice because by a different arrangement of the parts the device may be designed to wind a clock on the forward, instead of the rearward, swinging movement of the pendulum. The term "winding direction" as used herein is intended to include winding either by rearward or forward swinging movements of the pendulum, as the case may be.

Figure 2:
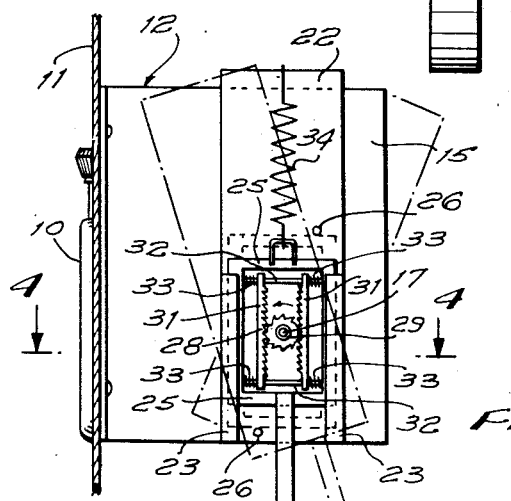
Fig. 2 is a view of the clock and self-winding mechanism at a right angle to that shown in Fig. 1.

A spring 34 connected to the frame 25 is so set as normally to hold the frame in such position as will keep it centered with respect to the wheel 28, as shown in Fig. 2, thus permitting the frame to move up and down relatively to the wheel as the vehicle passes over bumps or rough roads.

Both the up and down movements of the frame 25 provide impulses that afford additional means of winding the clock. On movement of the frame in one direction one rack 31 will engage the wheel 28 while the other rack will become disengaged, and vice versa on movement of the frame in the opposite direction. In either case the wheel will be turned in winding direction. For instance, in the particular mechanism illustrated where winding is effected by counter-clockwise turning of the wheel, on upward movement of the frame the right hand rack 31 will engage the wheel and the left hand rack will be disengaged. On downward movement of the frame engagement of the racks with the wheel will be reversed, that is, the left hand one will be in engagement and the right hand one out of engagement. The fact that the racks can slide resiliently into and out of engagement with the wheel and their teeth are bevelled in opposite directions permits of turning movement of the wheel 28 in the same direction upon either upward or downward movements of the vehicle.

While I have described and illustrated a preferred embodiment of the mechanism, it is to be understood that modifications in structure and arrangement of parts may be made within the scope of the invention.

The term "vehicle" as used in the claims is intended to include boats as well as automobiles and the like that are provided with clocks having the self-winding mechanism.

What I claim is:

1. In a self-winding mechanism for a vehicle clock, a spindle, a driving gear fixed on the spindle, a pawl and ratchet appurtenant to the spindle to permit rotation thereof in one direction and prevent reverse motion, a toothed wheel fixed to the spindle, a plate supported on the spindle for swinging movement in a plane perpendicular to the axis of the spindle, a frame carried on the plate for limited up and down movements, resilient means normally holding the frame in its center position, a pendulum weight attached to the frame to cause oscillatory movement of the frame together with the plate and upward and downward movements of the frame independently of oscillatory movement of the plate, means carried by the frame to engage the toothed wheel to cause rotation thereof in winding direction upon swinging movement of the plate in one direction and upon upward and downward movements of the frame.

2. In a self-winding mechanism for a vehicle clock, according to claim 1, wherein the frame carries a pair of racks adapted to contacts opposite sides of the toothed wheel, and resilient means urging the racks into contact with said wheel to cause rotation thereof upon oscillatory movement of the frame in one direction and upon upward and downward movements of said frame, said resilient means permitting disengagement of both racks from said wheel upon oscillatory movement of the frame in reverse direction, and disengagement of one or the other of the racks upon upward or downward movements of said frame.

3. A self-winding mechanism for a vehicle clock comprising a spindle, a driving gear mounted on the spindle, a train of gears connected with the clock and adapted to be actuated by the driving gear to wind the clock upon rotary movements of the spindle, a ratchet-wheel fixed to the spindle, a pawl engaging the ratchet-wheel to permit rotation in the direction of winding and prevent rotation in reverse direction, a plate pivotally mounted on the spindle to oscillate in a plane perpendicular to the axis of the spindle, said plate having a pair of parallel guideways extending longitudinally thereof, a frame mounted to slide up and down in the guideways, a pendulum weight fixed to the frame to effect upward and downward sliding movements of the frame and oscillatory movement of the plate together with the frame, a spring secured to the plate with its lower end fastened to the frame to hold the latter normally in its center position, a toothed wheel fixed to the spindle and located upon the face of the plate within the frame, racks slidably carried on the frame, and springs bearing against the racks to urge them into engagement with the toothed wheel to cause said wheel to turn in winding direction upon swinging movement of the pendulum in one direction, said racks being disengaged from the wheel upon swinging movement of the pendulum in the opposite direction, one of said racks being in engagement with the toothed wheel and the other rack being out of engagement therewith upon upward and downward movements of the frame to cause said wheel to turn in winding direction during either of the latter movements.

References Cited in the file of this patent

UNITED STATES PATENTS

| | | |
|---|---|---|
| 1,554,896 | Tacchi | Sept. 22, 1925 |
| 1,750,078 | Willheim | Mar. 11, 1930 |
| 1,808,691 | Stringer | June 2, 1931 |

FOREIGN PATENTS

| | | |
|---|---|---|
| 218,553 | Great Britain | July 10, 1924 |